(12) United States Patent
Widzinski et al.

(10) Patent No.: US 8,750,621 B2
(45) Date of Patent: Jun. 10, 2014

(54) METHOD OF AUTHENTICATING SECURITY MARKER

(75) Inventors: Thomas J. Widzinski, Rochester, NY (US); Erwin L. Allmann, Penfield, NY (US); Thomas D. Pawlik, Rochester, NY (US); Judith A. Bose, Webster, NY (US); Gary M. Spinelli, Hilton, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 324 days.

(21) Appl. No.: 13/094,945

(22) Filed: Apr. 27, 2011

(65) Prior Publication Data
US 2012/0275640 A1  Nov. 1, 2012

(51) Int. Cl.
*G06K 9/46* (2006.01)

(52) U.S. Cl.
USPC ........... 382/194; 382/275; 382/100; 382/201; 382/220; 250/459.1; 235/454

(58) Field of Classification Search
CPC ... H04N 1/00005; H04N 7/0122; G06K 7/14; G06F 17/30802
USPC .......... 382/194, 275, 100, 201, 220; 250/459.1; 235/454
See application file for complete search history.

(56) References Cited

U.S. PATENT DOCUMENTS

| | | |
|---|---|---|
| 2003/0116747 A1 | 6/2003 | Lem et al. |
| 2004/0000998 A1 | 1/2004 | Karp |
| 2007/0023521 A1* | 2/2007 | Wildey et al. ............ 235/454 |
| 2008/0181447 A1* | 7/2008 | Adams et al. ............ 382/100 |
| 2009/0218401 A1 | 9/2009 | Moran et al. |
| 2010/0025476 A1 | 2/2010 | Widzinski, Jr. et al. |
| 2010/0052308 A1* | 3/2010 | Balinsky et al. ........... 283/70 |
| 2010/0155679 A1* | 6/2010 | Olm et al. ................ 252/600 |
| 2012/0202022 A1* | 8/2012 | Schulze-Hagenest ...... 428/207 |

FOREIGN PATENT DOCUMENTS

| | | |
|---|---|---|
| WO | WO 02/50790 A1 | 6/2002 |
| WO | WO 2010/071673 | 6/2010 |

OTHER PUBLICATIONS

"Image Analysis and Mathematical Morphology" vol. 1 by Serra from Academic Press, Inc., 1982, pp. 43-49 and 85-89.

* cited by examiner

*Primary Examiner* — Mike Rahmjoo
(74) *Attorney, Agent, or Firm* — Nelson Adrian Blish

(57) ABSTRACT

A method for authenticating security markers includes capturing an image of a region of interest on a product with a camera; storing image data in a two-dimensional array on a microprocessor; counting a number of pixels at or above a predetermined brightness level in the image data with the microprocessor to determine a first score; establishing an area within the image; counting a number of pixels within the area to determine a second score; calculating a ratio of the second score to the first score; and if the ratio is above a predetermined threshold the security marker is authenticated.

2 Claims, 8 Drawing Sheets

METHOD OF AUTHENTICATING SECURITY MARKER

CROSS REFERENCE TO RELATED APPLICATIONS

Reference is made to commonly-assigned U.S. patent application Ser. No. 13/094,931 (now U.S. Publication No. 2012/0275639), filed Apr. 27, 2011, entitled IMAGE ALGORITHMS TO REJECT UNDESIRED IMAGE FEATURES, by Widzinski et al.; and U.S. patent application Ser. No. 13/094,920 (now U.S. Publication No. 2012/0274467), filed Apr. 27, 2011, entitled DEACTIVATION OF A SECURITY FEATURE, by Pawlik et al.; the disclosures of which are incorporated herein.

FIELD OF THE INVENTION

This invention generally relates to security marker authentication and specifically to security markers applied at very low levels.

BACKGROUND OF THE INVENTION

If goods are not genuine, then product counterfeiting has occurred. If goods have been diverted from their intended channel of commerce, then the goods have been subject to product diversion.

Product counterfeiting occurs on artworks, CDs, DVDs, software recorded on CDs, fragrances, designer clothes, handbags, briefcases, automobile and airplane parts, securities, identification cards (driver's licenses, passports, visas, green cards), credit cards, smart cards, and pharmaceuticals. According to the World Health Organization, more than 7% of the world's pharmaceuticals are counterfeit. This percentage is higher in some countries, such as Colombia, where up to 40% of all medications are believed to be counterfeit. Until recently, the percentage of unauthorized medications in the United States has been virtually negligible due to a tightly controlled regulatory system that has made it extraordinarily difficult for counterfeiters to sell or distribute counterfeit medications. However, the recent explosion of internet drug sales from other countries and increasingly sophisticated counterfeiting techniques have substantially increased the amount of fraudulent drugs entering the United States.

Product diversion has also occurred on many of the aforementioned goods. Such diversion could result in the distribution and sale of goods which do not comply with the product specifications required in the markets where they are sold. For example, motorcycles intended to be sold without catalytic converters in a region with lower air pollution standards might be diverted to a region which does require such catalytic converters. Other negative effects include price inequities in certain markets, loss of exclusivity by some manufacturers or distributors, and damage to the goodwill, patent rights, and trademark rights of the manufacturer. Such diverted goods are sometimes referred to as "gray market" goods. Since the goods are genuine, it is sometimes difficult to determine whether the goods have been improperly diverted. This is especially true for a variety of goods such as, for example clothing, pharmaceuticals, and cosmetics.

The application of security markers to an object or product for authenticating the origin and intended market of the object product are known in the prior art. These security markers can be incorporated into components which make up the object or can be incorporated into papers, inks or varnishes that are applied to the object or labels affixed to the object or packaging for the object. The presence of security markers verifies the authentic origin of the object and is verified by means suited to the particular nature of the marker.

Non-destructive detection of security markers via characteristic emission capture on an image sensor during or following marker excitation is also known in the prior art. While marker-detector systems work well for these purposes, alternate marker materials applied with different detection modes may emit low intensity radiation across a broad spectrum. When detecting intended markers at extremely low levels, cross talk from unintended markers with radically different emission profiles can be observed. Generally, these marker signatures are observed with localized areas of high density emission points. These features are used to discriminate intended from unintended marker signals. This radiation may appear as intended marker emission with regard to emission intensity. Generally, the interfering marker emission will differ from intended marker emission patterns with respect to spatial distribution.

SUMMARY OF THE INVENTION

Briefly, according to one aspect of the present invention a method for authenticating security markers includes capturing an image of a region of interest on a product with a camera; storing image data in a two-dimensional array on a microprocessor; counting a number of pixels at or above a predetermined brightness level in the image data with the microprocessor to determine a first score; establishing an area within the image; counting a number of pixels within the area to determine a second score; calculating a ratio of the second score to the first score; and if the ratio is above a predetermined threshold the security marker is authenticated.

A properly marked object will be able to provide emissions that are detected as small dots with relatively low spatial density and that are centered within an image window. A circle constructed of radius r with origin at the spatial center of the window will include a majority of marker emission pixels. If the illuminated pixels are summed within this described circle, and then compared to the sum of illuminated pixels in the entire frame, a score ratio will result. Finally, this ratio is compared to a previously determined value. Ratios above the previously determined value will indicate a pass.

A failing condition is typically encountered when a high spatial density extraneous marker signal is encountered in the periphery of the detection window, that is, outside the circle described by radius r, but within the image frame. In this case, the ratio of summed marker signal pixels inside the circle as compared to the entire frame will result in a value lower than the predetermined reference value. Any single criterion failure will result in global rejection of the object under scrutiny.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
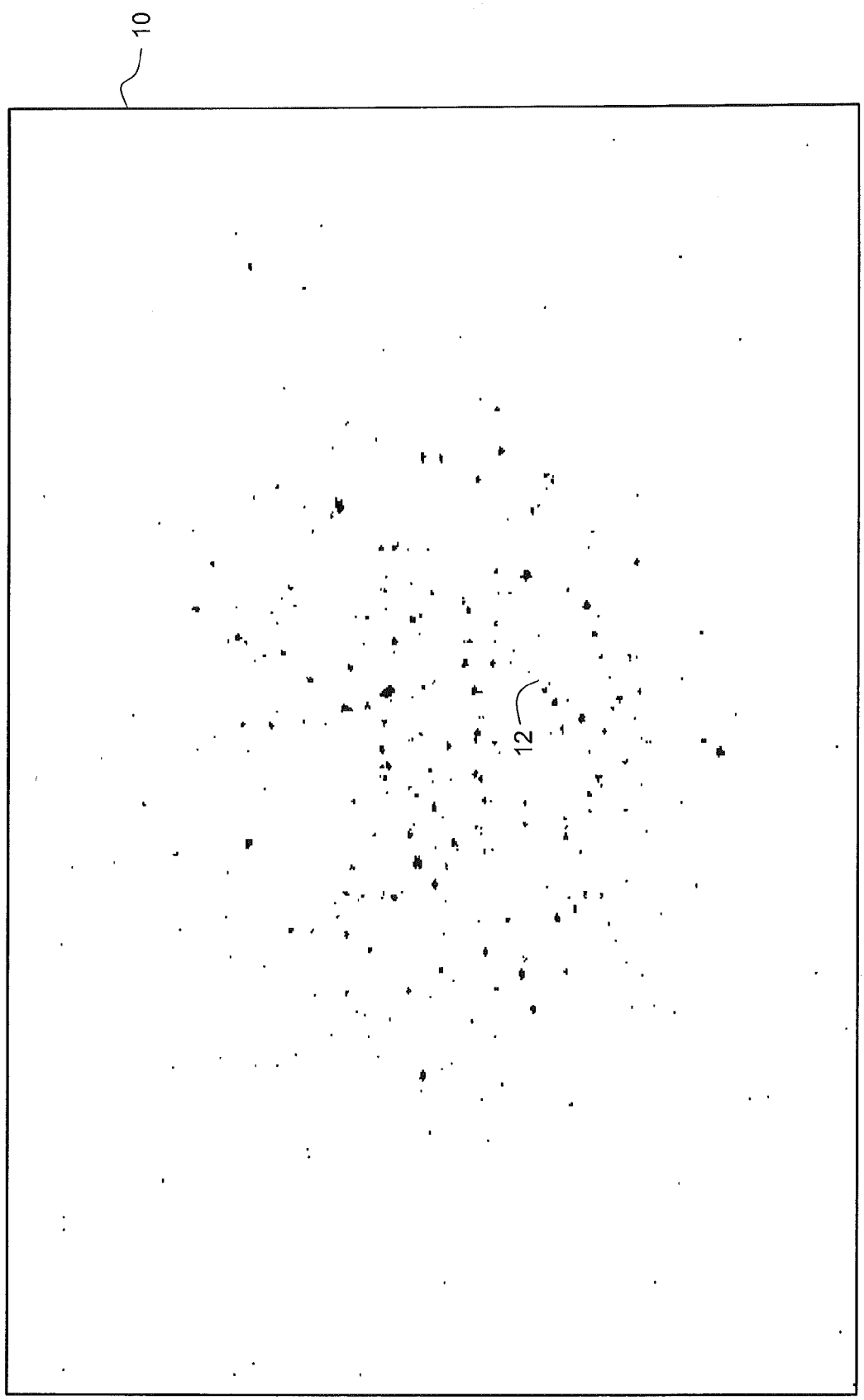
FIG. 1 is a typical marker emission image and provides visual reference for the concept of small dots with low spatial density of emission image pixels.
Figure 2:
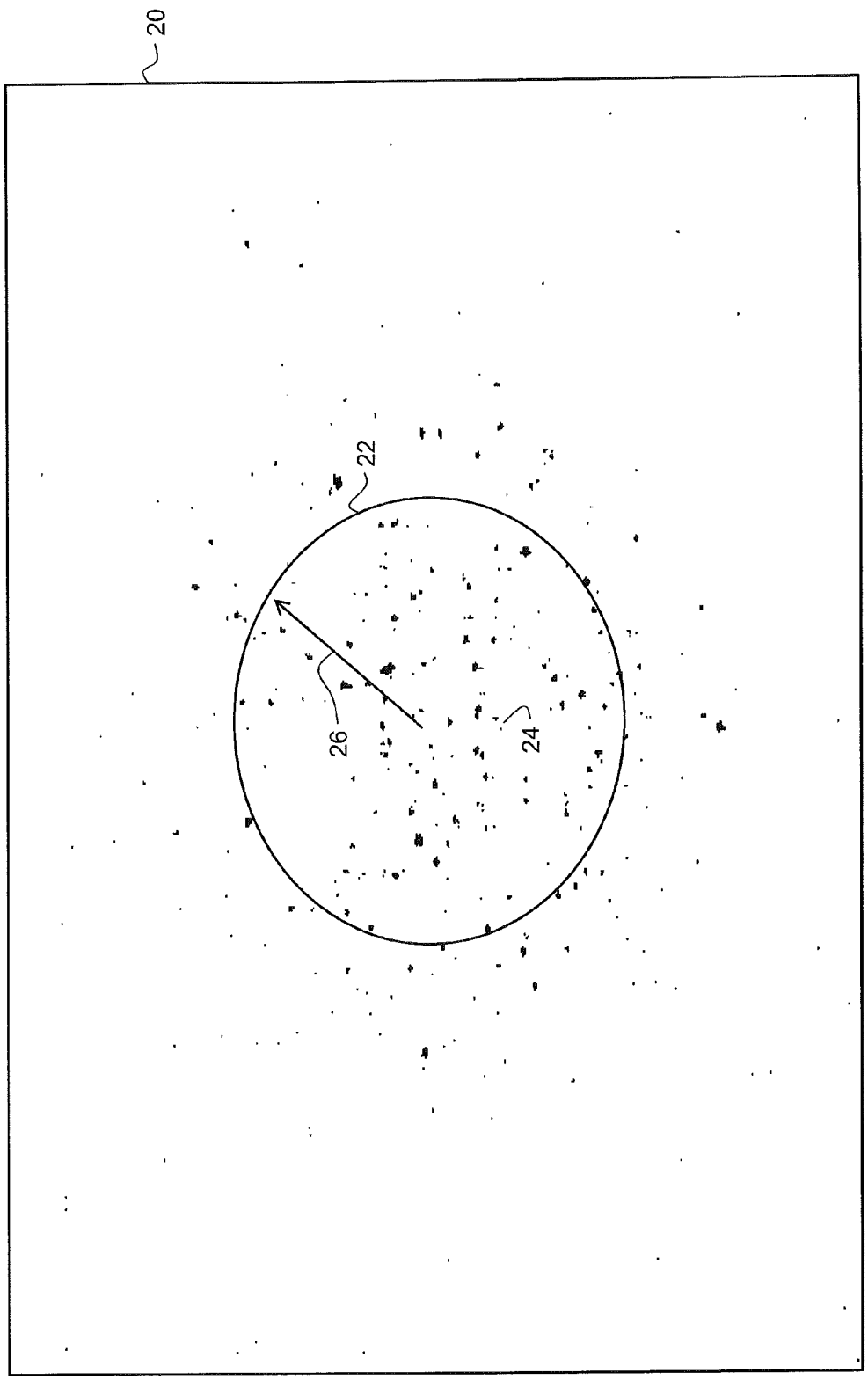
FIG. 2 is the same emission image presented FIG. 1, but includes a circle of radius r originating from the image center.

Referring now to FIG. 1 which is an emission image frame 10, with individual emission spots 12, emanating from a marker on an object with preferred spatial density and pixel intensity. Also apparent is the relatively small signal spatial area represented by a single marker particle. Owing to this centered, uniform distribution, one can see that a high fraction of marker signal is contained in a spatial subset described by a circle whose origin is the image center and having sufficient radius r. FIG. 2 is an excellent representation of this concept. Within the image frame 20, a circle 22 is constructed from the image frame center with sufficient radius 26 to contain a high fraction of emission signal represented by emission dots 24.

Figure 3:
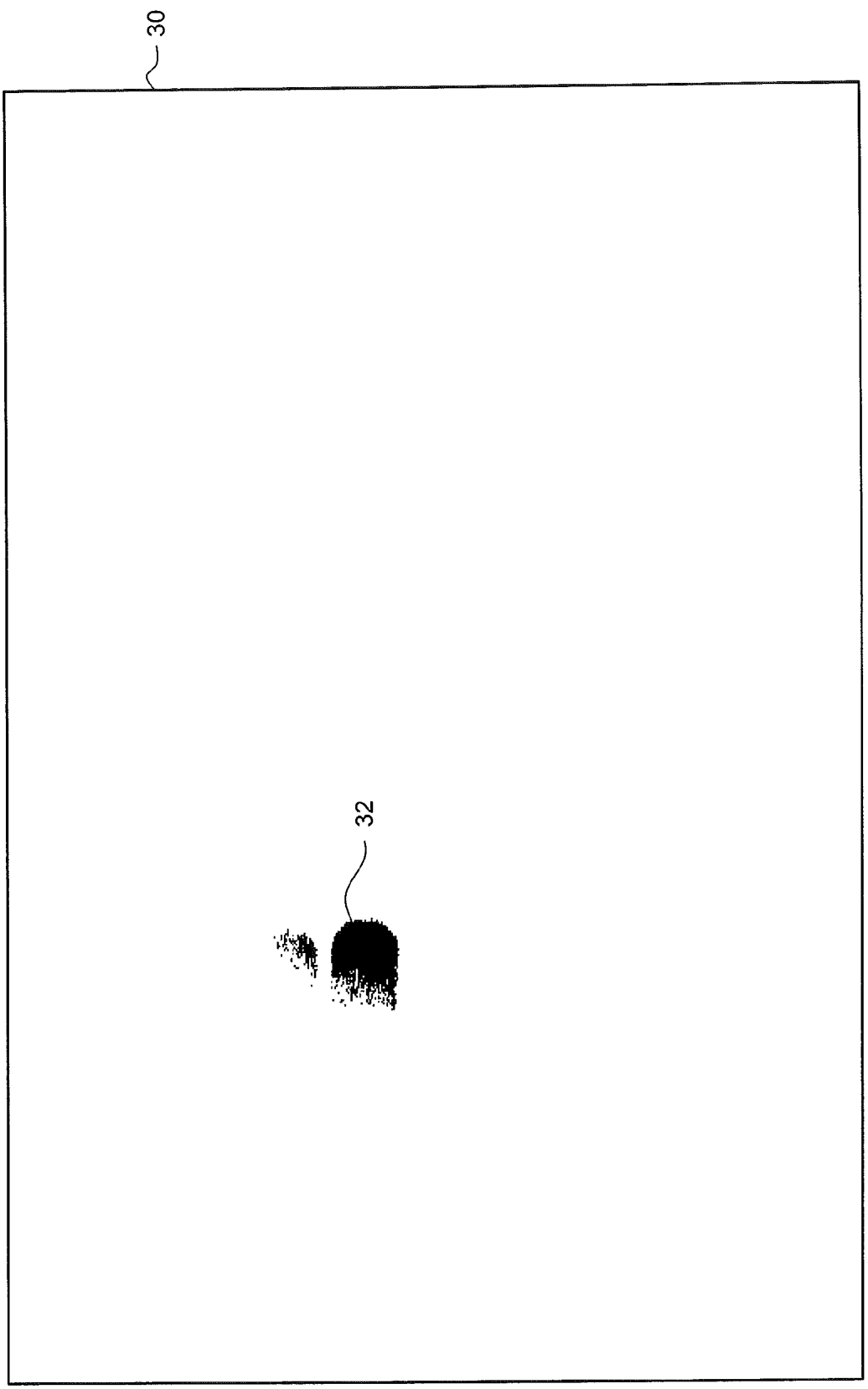
FIG. 3 is an atypical marker image illustrating a non-centered, high spatial density marker signal.
Figure 4:
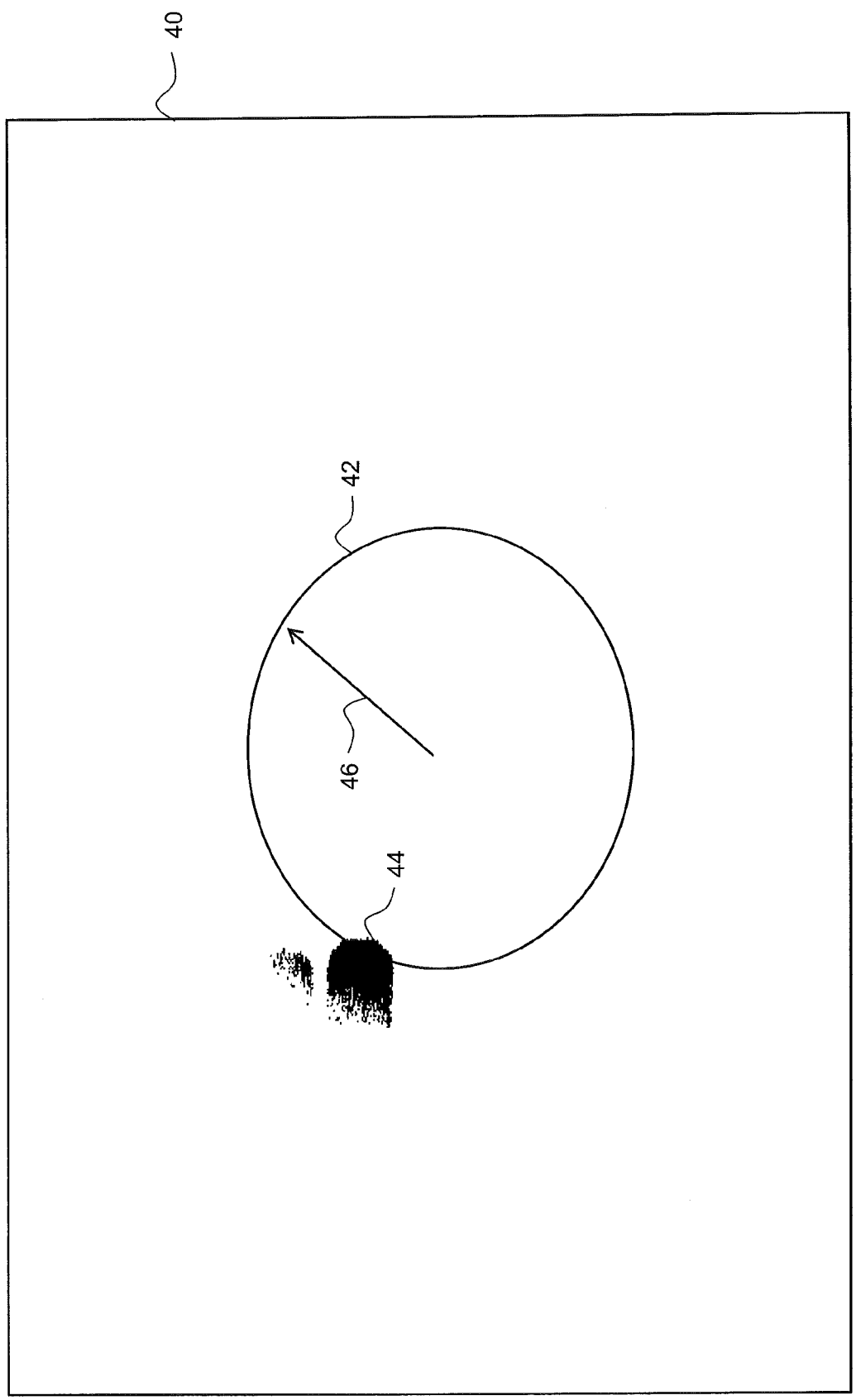
FIG. 4 is an atypical marker image including a circle described by radius r (same as FIG. 2) originating from the image center.

Referring now to FIG. 3 image frame 30 where the emission signal 32 is not detected in the preferred manner, its high spatial density pattern and emission characteristics create an interference signal. FIG. 4 illustrates an image frame 40 containing a circle 42 centered in the frame with radius r (46), and includes very little of the emission signal 44. Division of the sum of illuminated pixels within the circle by total illuminated pixels within the entire frame will result in a low fractional value. Finally, comparison of the low calculated fraction with a pre-determined value, preferably 40%, will result in a fail condition.

Reference values for final comparison are preferably greater than 40%. Calculated values lower than 40% result in failure. This test of authenticity is one of several. Failure of any individual test will result in a global fail condition.

Figure 5:
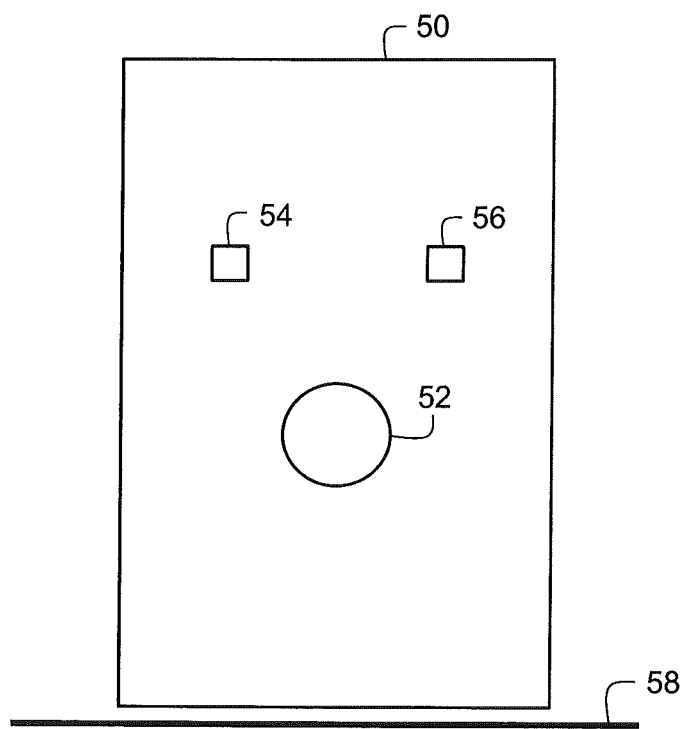
FIG. 5 is a self-contained hand held reading device capable of reading, interpreting and indication of pass or fail.
Figure 6:
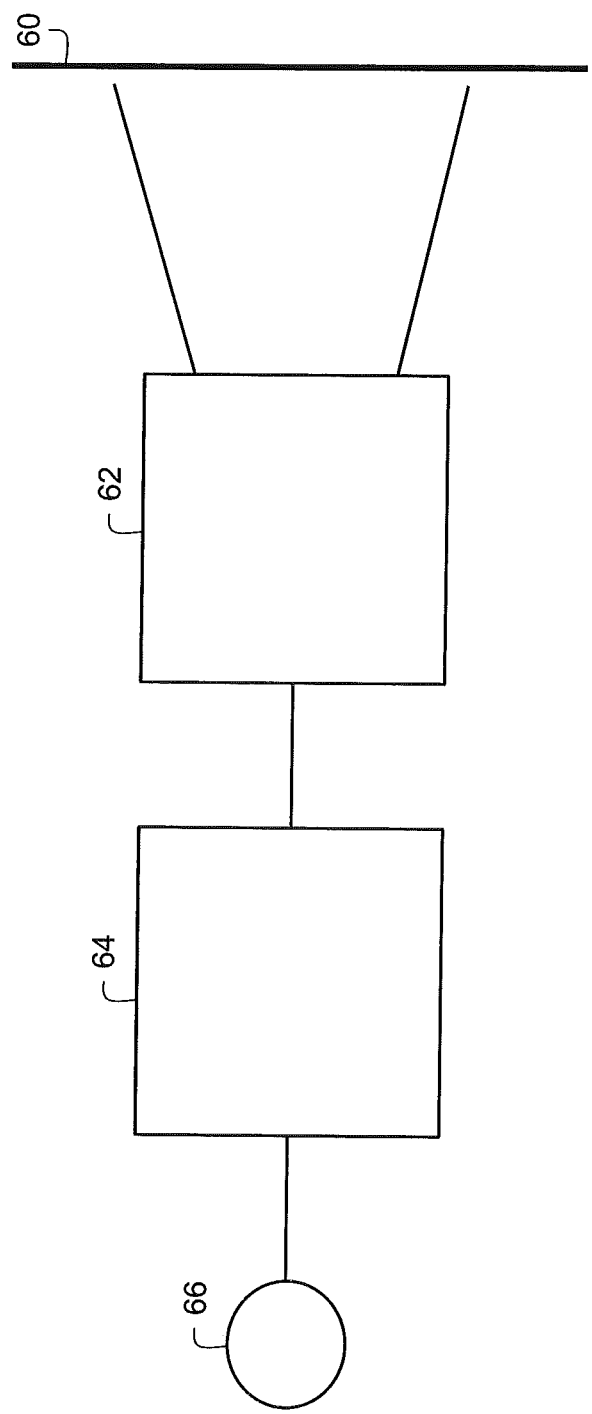
FIG. 6 are sub-modules contained within the hand-held reading device.

All image acquisitions, processing, comparisons and status indications are conducted and indicated within the handheld reading device illustrated in FIG. 5. This device includes a read actuation button 52, a pass indicating LED 54, a fail indicating LED 56 and reads the target 58. Subsystems in FIG. 6 are contained within the reading device 50. These subcomponents include the reading target or marked item 60, a camera module 62, a processor and memory module 64 and a pass indicator 66. This system has been described in prior art, specifically WO 2010/071673 A1.

Figure 7:
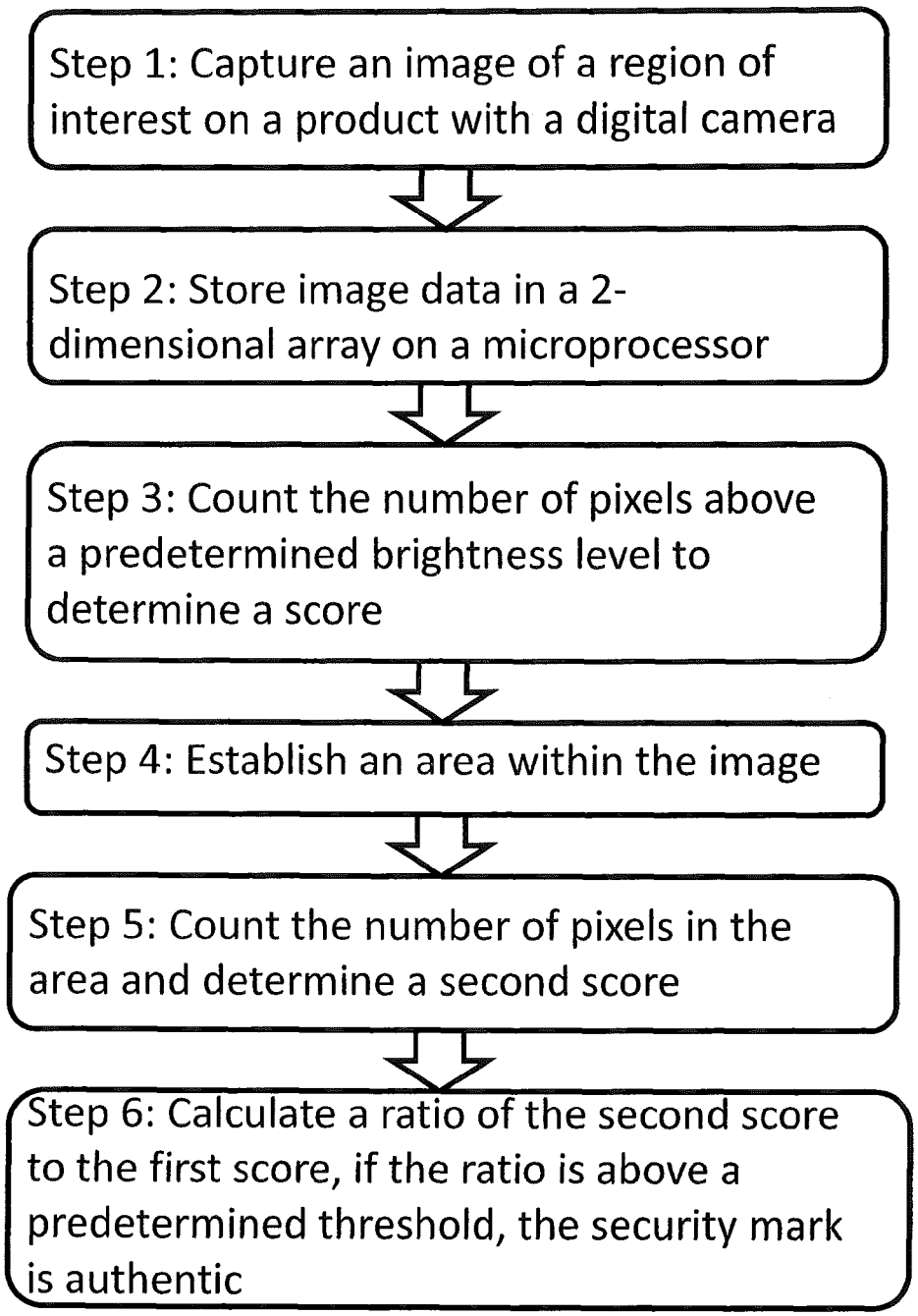
FIG. 7 depicts a step-by-step flowchart describing one embodiment of the method of this invention.

FIG. 7 depicts a step-by-step flowchart describing one embodiment of the method of this invention. The method involves the following steps: capturing an image of a region of interest on a product with a camera; storing image data in a two-dimensional array on a microprocessor; counting a number of pixels at or above a predetermined brightness level in the image data with the microprocessor to determine a first score; establishing an area within the image; counting a number of pixels within the area to determine a second score; calculating a ratio of the second score to the first score; and if the ratio is above a predetermined threshold the security marker is authenticated.

Figure 8:
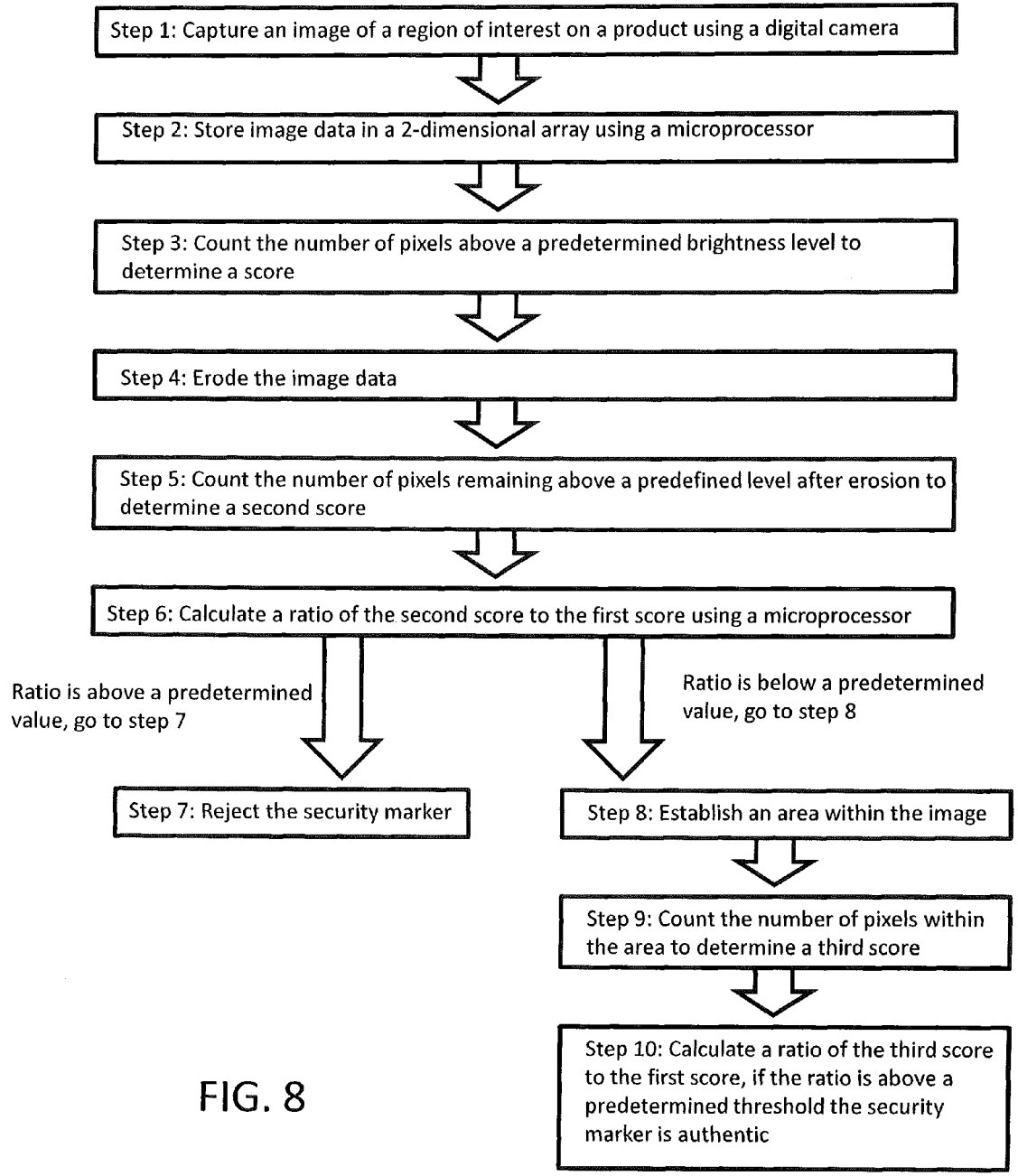
FIG. 8 depicts a step-by-step flowchart describing a second embodiment of the method of this invention.

FIG. 8 depicts a step-by-step flowchart describing a second embodiment of the method of this invention. The method involves the following steps: capturing an image of a region of interest on a product with a camera; storing image data in a two-dimensional array on a microprocessor; counting a number of pixels at or above a predetermined brightness level in the image data with the microprocessor to determine a first score; eroding the image data; counting the pixels which remain at or above a predetermined brightness level after erosion to determine a second score; calculating a ratio of the second score to the first score; if the ratio of the second score to the first score is above a predetermined threshold, the security mark is rejected; if the ratio of the second score to the first score is below a predetermined threshold establishing an area within the image; counting a number of pixels within the area to determine a third score; calculating a ratio of the third score to the first score; and if the ratio is above a predetermined threshold the security marker is authenticated.

The invention has been described in detail with particular reference to certain preferred embodiments thereof, but it will be understood that variations and modifications can be effected within the scope of the invention.

Parts List

10 emission image
12 preferred emission spatial density dots
20 image frame
22 circle constructed from image frame center
24 preferred emission spatial density dots contained within circle
26 radius r from origin used to construct circle 22
30 image frame
32 emission signal
40 image frame
42 circle constructed from image frame center
44 emission signal
46 radius r from origin used to construct circle 42
50 self-contained reading device
52 power actuation button
54 pass indication LED
56 fail indication LED
58 marked item
60 marked item
62 camera module
64 processor and memory module
66 pass indicator

The invention claimed is:

1. A method for authenticating security markers comprising:
    capturing an image of a region of interest on a product with a camera;
    using a microprocessor to store image data of the image in a two-dimensional array in a memory;
    using the microprocessor to count a number of pixels at or above a predetermined brightness level in the image data to determine a first score;
    using the microprocessor to establish a circle that excludes a portion of the image, the circle having a center at the spatial center of the image;
    using the microprocessor to count a number of pixels above the predetermined brightness level within the circle to determine a second score;
    using the microprocessor to calculate a ratio of the second score to the first score; and
    if the ratio is above a predetermined threshold, using the microprocessor to authenticate the security marker.

2. A method for authenticating security markers comprising:
- a) capturing an image of a region of interest on a product with a camera;
- b) storing image data of the captured image in a two-dimensional array in a memory with a microprocessor;
- c) counting a number of pixels at or above a predetermined brightness level in the image data with the microprocessor to determine a first score;
- d) eroding the image data with the microprocessor;
- e) counting the pixels that are at or above the predetermined brightness level after erosion to determine a second score with the microprocessor;
- f) calculating a ratio of the second score to the first score with the microprocessor;
- g) if the ratio of the second score to the first score is below a predetermined threshold go to step h), if not reject the security marker;
- h) establishing a circle within the image that excludes a portion of the image, the circle having a center at the spatial center of the image with the microprocessor;
- i) counting a number of pixels at or above the predetermined brightness level within the circle to determine a third score;
- j) calculating a ratio of the third score to the first score with the microprocessor; and
- k) if the ratio is above a predetermined threshold the security marker is authenticated.

* * * * *